United States Patent [19]
Dunlop et al.

[11] 3,867,199
[45] Feb. 18, 1975

[54] NICKEL HYDROGEN CELL

[75] Inventors: James D. Dunlop, Gaithersburg, Md.; Jose Giner, Sudbury, Mass.; Gerrit Van Ommering, Adelphi; Joseph F. Stockel, Gaithersburg, both of Md.

[73] Assignee: Communications Satellite Corporation, Washington, D.C.

[22] Filed: June 5, 1972

[21] Appl. No.: 259,524

[52] U.S. Cl. ................................. 136/28, 136/86 A
[51] Int. Cl. .................... H01m 43/04, H01m 27/00
[58] Field of Search .................. 136/6 gC, 28, 86 A

[56] References Cited
UNITED STATES PATENTS

| | | | |
|---|---|---|---|
| 3,348,975 | 10/1967 | Ziering | 136/86 D |
| 3,395,047 | 7/1968 | Terry et al. | 136/86 D |
| 3,438,815 | 4/1969 | Giner | 136/86 D |
| 3,669,744 | 6/1972 | Tsenter et al. | 136/28 |

Primary Examiner—John H. Mack
Assistant Examiner—H. A. Feeley
Attorney, Agent, or Firm—Alan J. Kasper; James W. Johnson, Jr.

[57] ABSTRACT

A new rechargeable electric cell of the type using a reoxidizable nickel oxide at the positive electrode and hydrogen as the negative electrode reactant. The cell case is pressurized with hydrogen gas while the cathode is in a discharged state and then is sealed off. Additional hydrogen gas is evolved during charging. On discharging the cell, hydrogen is consumed. The cell has inherent protection against damage from overcharging and overdischarging, and the state of charge can be determined by monitoring the gas pressure in the cell case.

12 Claims, 4 Drawing Figures

NICKEL HYDROGEN CELL

This invention relates to rechargeable power cells and more particularly to an improved cell in which the cathode is a metal oxide and an oxidizable and ionizable gas is the anodic agent.

BACKGROUND OF THE INVENTION

Substantial attention has been devoted to the development of electric power cells which employ a gas as one member and a chemically active solid state material as the other member of the electrochemical couple. One such type is a cell in which the anode is a chemically oxidizable metal and the depolarizer is oxygen, e.g. zinc/air and cadmium/air batteries. A second type utilizes an electrochemically reducible metal oxide, e.g. nickel oxide, at the cathode and a gas that is oxidizable and ionizable, e.g. hydrogen, at the anode. A cell of the latter type is disclosed in U.S. Pat. No. 3,544,375, issued Dec. 1, 1970, to Samuel Ruben for Rechargeable Fuel Cell.

The present invention also employs a reducible metal oxide cathode and an oxidizable and ionizable gas as the anodic agent. The primary object of the invention is to provide a rechargeable cell of the character described that overcomes certain of the limitations yet offers substantially all of the advantages of the cell disclosed by the aforesaid Ruben patent. More particularly, the invention avoids the requirements set forth in the Ruben patent of feeding hydrogen gas into the cell when it is being discharged, venting hydrogen gas when the cell is being recharged and submerging the cathode and anode in the electrolyte. Another object of the invention is to provide a cell of the character described which can be repeatedly charged and discharged without need to add more oxidizable gas to the cell to sustain operation. A further object is to provide a cell of the character described that can operate over a wide range of ambient temperatures, has a relatively high energy density, and can be constructed in various configurations. Yet another important object is to provide an electric cell having inherent overcharge and overdischarge protection and whose capacity or state of charge can be determined by measuring the gas pressure within the cell casing.

SUMMARY

Broadly stated, the invention involves a cathode element which as formed comprises nickel hydroxide on a conductive support. After formation the nickel hydroxide is brought by anodic treatment to an active oxide state so that it can discharge as a consequence of oxidation of monatomic hydrogen produced at the negative electrode. The latter comprises at least one catalytic layer, the catalytic layer comprising a catalyst such as platinum or palladium which is capable of dissociating molecular hydrogen into monatomic hydrogen. Disposed between and contacting the negative and positive electrodes is a separator or matrix element which is wetted with an electrolyte such as an aqueous KOH solution. Each cell may comprise a single pair but preferably a plurality of pairs of negative and positive electrodes with an electrolyte-wetted matrix or separator between each negative and positive electrode. The electrodes and separators may be disposed in a stacked, cylindrical, spiral or other suitable configuration. Whatever the configuration, the assembly of electrodes and separator(s) is disposed in a pressure resistant chamber which is hermetically sealed after being filled under pressure with hydrogen. The chamber is evacuated and filled with hydrogen to a selected pressure while the positive electrode is in a discharged state, whereby the cell has sufficient hydrogen to provide overcharge protection. The cell chamber remains sealed at all times during charging and discharging operations. The capacity or state of charge of the cell can be determined by measuring the gas pressure in the sealed chamber.

DETAILED DESCRIPTION OF THE INVENTION

Figure 1:
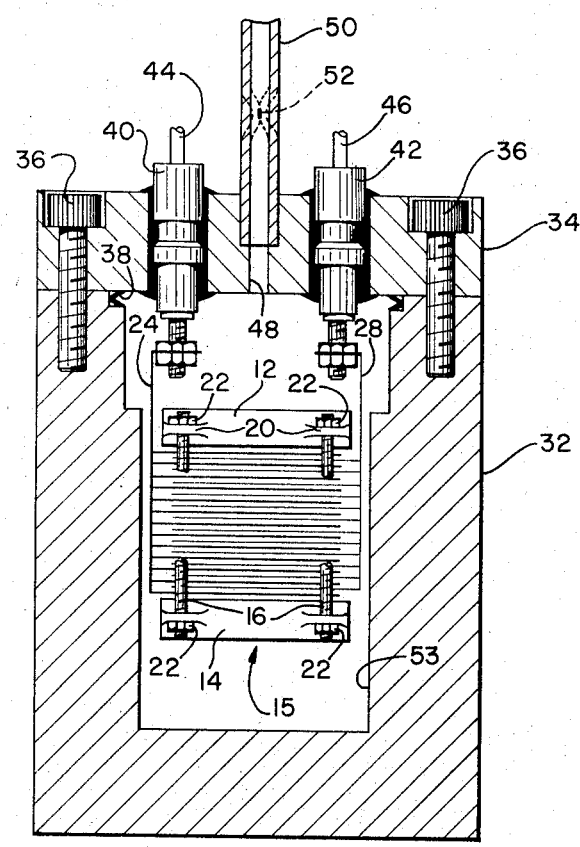
FIG. 1 is a vertical section view (partly in schematic form) of a Ni/H$_2$ cell constituting a preferred embodiment of the invention.
Figure 2:
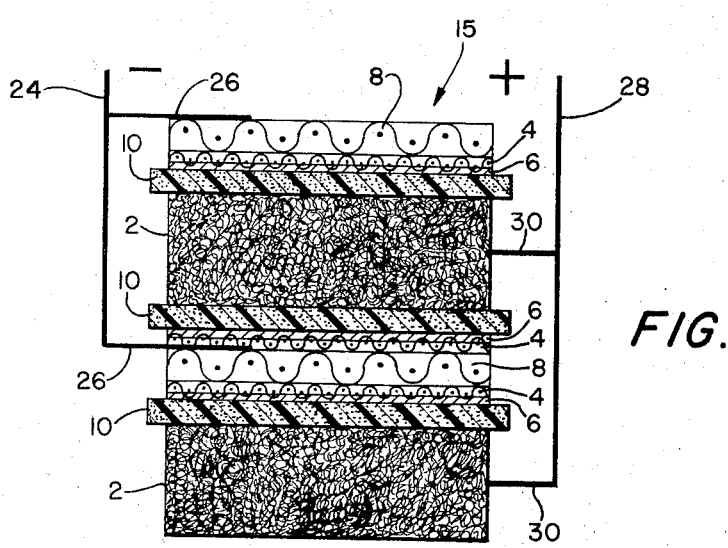
FIG. 2 is an enlarged vertical sectional view showing details of a portion of the stack of plates embodied in the cell of FIG. 1.

Before describing the preferred embodiment in detail, it is to be noted that, for the sake of convenience of illustration and also to facilitate understanding of the invention, in FIG. 1 the electrolyte matrices are omitted and the positive and negative electrodes are illustrated in schematic form. FIG. 2 shows actual details of construction and disposition of the electrodes and matrices embodied in the device of FIG. 1.

Referring now to FIGS. 1 and 2, the preferred embodiment of the invention comprises a plurality of positive electrodes 2 which are in the form of flat, porous, sintered nickel plaques impregnated with Ni(OH)$_2$. The plaques are made by pressing nickel powder and a suitable binder, e.g. methylcellulose, into plate form and then sintering the pressed mixture to burn off the binder so as to render the plate porous. The sintering preferably is done in a hydrogen atmosphere at a suitable temperature, e.g. 900°C. These plaques are then impregnated with Ni(OH)$_2$. This may be done by immersing the plaques in an aqueous nickel nitrate solution, removing them from the solution, and then making the plaques cathodes in an aqueous KOH electrolyte whereby the nickel nitrate is cathodized to nickel hydroxide, Ni(OH)$_2$. Thereafter the impregnated plaques are washed to remove any residual nitrate and the nickel hydroxide is oxidized to a trivalent state (NiOOH) by anodizing in an alkaline electrolyte, e.g. aqueous KOH. An alternative mode of impregnating the plaques (and the ones used in making the cathodes of the cell used in Example I below) consists of immersing the sintered plaques in a nickel nitrate solution, which contains 500 grams Ni(NO$_3$)$_2$ per liter of water, long enough to fill their pores, removing the plaques from the solution and drying them in air, and immersing them in a potassium hydroxide bath at 80°C so that the infiltrated Ni(NO$_3$)$_2$ reacts with the KOH to form Ni(OH)$_2$. Regardless of the procedure used to form the cathodes, it usually must be repeated a number of times to load the plaques with sufficient Ni(OH)$_2$ to provide a desired capacity. Once the plaques have been loaded with the desired amount of nickel hydroxide, they are oxidized (to the trivalent state) and reduced, i.e. charged and discharged, by anodizing and cathodizing in potassium hydroxide or other suitable alkaline electrolyte. This charging-discharging procedure is preferably repeated at least about three times to assure that all of the nickel hydroxide is activated, i.e. oxidized, and also to allow time for loose particles to fall off of the plates. Such loose particles are undesired in the assembled cell since they may cause short-circuiting.

The negative electrodes are constructed in the manner of conventional catalytic fuel cell electrodes and thus in the illustrated embodiment each anode comprises two relatively thin nickel screens 4 coated on one side with a layer 6 consisting of platinum intermixed with and bonded by Telfon or other suitable hydrophobic plastic matrix material. Each negative electrode comprises a relatively coarse nickel screen support 8 that is substantially thicker than the screens 6. The screen support 8 is positioned between and engages the uncoated sides of screens 6.

Positioned between each positive electrode 2 and the adjacent negative electrode assembly is a separator 10 made of a porous material. Preferably the separator is a polypropylene mat which is porous to the electrolyte and hence it is sometimes referred to herein as an electrolyte matrix. The positive and negative electrodes and separators are assembled in a stack in the order shown in FIG. 2. It is to be noted that FIG. 2 shows only a few of the above-described positive and negative electrodes and electrolyte matrices and that additional like members may be added to form a relatively large stack of plates as contemplated in the device of FIG. 1. Assuming that a desired number of plates have been assembled in the order shown in FIG. 2, the resulting stack 15 is disposed between and held together by two nickel plates 12 and 14 that are secured by two or more tie rods 16 (FIG. 1). The tie rods may extend through matching holes formed in the electrodes and electrolyte matrices, in which case they must be insulated from the electrodes and matrices to prevent short-circuiting. This is best accomplished by making the tie rods of electrical insulating material. Preferably, however, the tie rods are mounted exterior of the electrode stack. Thus as shown, the plates 12 and 14 have ears 20 on their peripheries and the tie rods 16 extend through and are secured to such ears by nuts 22 as shown. The several negative electrode assemblies are electrically connected together by a nickel strap 24 which has tabs 26 that are welded to each of the coarse screens 8. The cathodes 2 are electrically connected together by a second nickel strap 28 which has tabs 30 that are welded to the sintered nickel plaques.

This assembled stack is mounted in a nickel casing 32 that is formed with one open end. The latter is closed off by a nickel end cap 34 which is secured in place in any conventional manner that provides a hermetic seal. In this case the end cap is secured in place by means of screws 36 that are screwed into tapped holes in the casing and a ring seal 38 which is compressed by the end cap in a groove formed in the casing so as to provide assurance against gas leakage. Mounted in openings in the end cap are two electric terminal assemblies comprising ceramic feedthrough insulators 40 and 42 formed around terminal leads 44 and 46 respectively. A preferred form of feedthrough insulator is shown in U.S. Pat. No. 3,109,055. The insulators are mounted and hermetically sealed to the end cap to prevent gas leakage. The straps 24 and 28 are attached to the inner ends of terminal leads 44 and 46 respectively as shown in FIG. 1.

The end cap also has a port 48 in which is mounted and hermetically sealed a nickel filling tube 50 which is permanently closed off by suitable means, e.g. by pinching the tube and welding it to itself as shown at 52, after the chamber 53 of the casing is pressurized with hydrogen as hereinafter described. The end cap may have a second port (not shown) which provides access to a pressure transducer for measuring the pressure in the casing. Alternatively, the filling tube 50 may be replaced by a tee fitting, with a pressure gauge or transducer connected to one side of the fitting and the third side of the fitting connected to the port 48.

In assembling the cell a quantity of the electrolyte, preferably a 20–35% water solution of potassium hydroxide, is placed in the casing prior to insertion of the cell stack and attachment of the end cap. The quantity of electrolyte placed in the cell is limited; preferably there is just enough electrolyte to wet the electrolyte matrices, the nickel electrodes and the catalytic layers of the anode plates. However, a greater amount of electrolyte may be used, e.g. enough electrolyte may be used to leave a small residual pool thereof in the casing. In no event, however, should the amount of electrolyte be great enough to keep the cell stack immersed. With the electrolyte added, the cell stack 15 is inserted and the end cap is attached. It also is possible to add the electrolyte to the casing via the filling tube after the cell stack is inserted and the end cap secured in place. As an alternative procedure, it is possible to immerse the cell stack in the electrolyte outside of the casing long enough to get the desired degree of wetting and then to place the cell stack in the casing. Assuming that the electrolyte is added directly to the casing, the end cap is secured in place, the filling tube is blocked off and the casing is turned upside down and rotated or tilted so that the electrolyte will contact and wet the plates of the cell stack to the degree required. Once this is done, the casing is filled with hydrogen to a selected pressure and then the filling tube is permanently closed off.

Preferably the positive plates are in fully discharged state when the casing is initially pressurized with hydrogen. This assures protection against overdischarge as described more fully below.

Operation of the cell of FIGS. 1 and 2 will now be described. Assume that the cell has been fully charged, and that it is connected for discharge through an exterior circuit. Hydrogen gas diffuses through electrolyte surrounding the catalyst surfaces of the negative plates, and after arriving at said surfaces becomes dissociated by the catalyst to the monatomic form. This monatomic hydrogen is ionized and combines with hydroxyl ions to form water with an electron being released in the process of forming each hydrogen ion. The reactions at the negative electrode are as follows:

$$H_2 \rightarrow 2H \tag{1}$$

$$2H \rightarrow 2H^+ + 2e \tag{2}$$

$$2H^+ + 2OH^- \rightarrow 2H_2O \tag{3}$$

The net reaction at the negative electrode during discharge is:

$$\tfrac{1}{2}H_2 + OH^- \rightarrow H_2O + e \tag{4}$$

Hydroxyl ions are formed at the positive electrode by reaction of water with the available oxygen component of the nickel oxide. The representative reaction at the positive electrode during discharge is as follows:

$$NiOOH + H_2O + e \rightarrow Ni(OH)_2 + OH^- \tag{5}$$

As a result of these reactions, an electron current is produced in the exterior circuit and the total cell reaction is as follows:

$$NiOOH + \tfrac{1}{2}H_2 \rightarrow Ni(OH)_2 \tag{6}$$

On recharging, the reaction (6) is reversed. The recharging mode is characterized by the regeneration of hydrogen gas at the negative electrode and the reoxidation of the nickel hydroxide at the positive plate.

A cell constructed in accordance with the teaching of this invention has inherent or built-in protection against overcharging or overdischarging. This built-in protection is facilitated by the fact that the cell is pressurized with hydrogen gas while the positive electrodes are in a fully discharged state and also by the fact that the electrodes are not immersed in the electrolyte. Using a limited amount of electrolyte facilitates diffusion of hydrogen and oxygen for reaction as herein described. The protection against overcharging and overdischarging will not be described.

Consider first the case of charging the cell. On charging the $Ni(OH)_2$ is oxidized to $NiOOH$. During the charging cycle, the positive electrode reaches an endpoint corresponding to completion of the following reaction:

$$Ni(OH)_2 + OH^- \rightarrow NiOOH + H_2O + e \tag{7}$$

The negative electrode, on the other hand, has no such endpoint since it simply continues to consume water according to the following reaction:

$$H_2O + e \rightarrow \tfrac{1}{2} H_2 + OH^- \tag{8}$$

Thus as the positive plates approach the fully oxidized (charged) state, oxygen and water begin to be produced at the positive electrode according to the following reaction:

$$2OH^- \rightarrow \tfrac{1}{2}O_2 + H_2O + 2e \tag{9}$$

However, at this time hydrogen is also being evolved at the negative electrode according to reaction (8). In the presence of the catalyst surface and the large amount of hydrogen, the oxygen evolved at the positive electrode reacts to produce water according to the following reaction:

$$H_2 + \tfrac{1}{2}O_2 \rightarrow H_2O \tag{10}$$

or it may be reduced directly at the negative electrode according to reaction (11) which is the reverse of reaction (9):

$$\tfrac{1}{2}O_2 + H_2O + 2e \rightarrow 2OH^- \tag{11}$$

It is not known (and also immaterial) which of the above recombination reactions occur, or if both occur, which one predominates. In any event, any oxygen that is released as a result of overcharging the positive electrode is consumed by reaction within the cell, and thus the cell is protected against overcharging. It is to be noted that with both recombination processes, the same quantity of current is passed, resulting in the conversion of energy (equivalent to the difference in potential between both electrodes) to heat with no net mass change.

Consider now the case of discharging the cell. On discharging the cell, the positive electrode material is reduced to $Ni(OH)_2$ and hydrogen gas in the cell is consumed. If the cell is part of a larger array of cells, e.g. a group of series-connected units of the type shown in FIG. 1, cell reversal (or overdischarge) can occur as current continues to flow through the discharged cell. In this case, as the positive electrode plates approach the full discharge condition, hydrogen gas begins to be evolved at the positive plates by reaction of water according to the reaction (8) above (it is to be noted that the reduction of $Ni(OH)_2$ to nickel is quite slow). At the same time hydrogen oxidation occurs at the negative plates according to reaction (4) above since enough hydrogen is present (the amount of hydrogen in the cell is in excess of the stoichiometric requirement due to hydrogen being supplied to the cell while in a full discharged state) to minimize serious hydrogen depletion at the negative electrodes. As a consequence, overdischarging produces no deleterious effect on the electrodes. A unique feature of this overdischarge protection is that it allows the cell to be reversed with very little heat generation.

An advantage of this invention is that the pressure in the cell can be used as a quantitative indication of the state of charge. As noted above, the cell is pressurized with hydrogen while the positive plates are in a discharged state. As the cell is charged, hydrogen is evolved and this causes the pressure in the cell casing to increase. When the cell is again discharged, hydrogen gas is consumed and the gas pressure in the casing drops.

Figure 3:
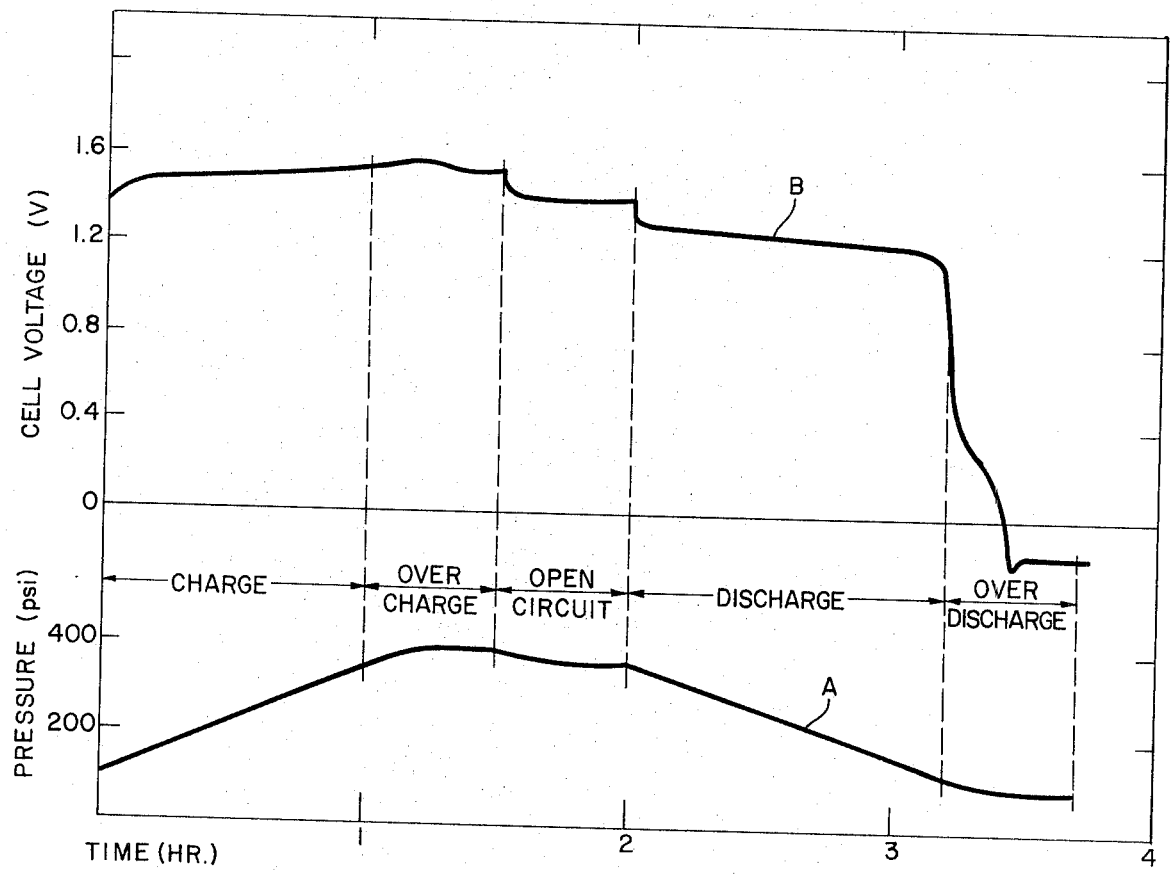
FIG. 3 consists of curves illustrating how the cell gas pressure and cell voltage of a preferred embodiment of the invention vary during a typical test cycle of charging and discharging.

FIG. 3 illustrates the relationship of cell gas pressure to cell voltage for a cell that was charged at the C/1 rate and discharged at the C/1.2 rate under constant current. Curve A depicts the changes in gas pressure and Curve B depicts the changes in cell voltage for a typical cell testing cycle. In this figure, the gas pressure is in lbs/sq. inch; the cell voltage is in volts; and the time is in hours. The cell tested was pressurized with hydrogen in the discharged state to a level of about 100 psi. During charge the pressure-time Curve A is substantially linear with a slope of about 45 psi/Ahr. However, Curve A departs from linearity as the cell goes from the full charged state to the overcharge state and, due to the overcharge protection mechanism described above, the gas pressure levels off as the overcharge period is extended as shown. During overcharge, the cell potential goes through a maximum of about 1.5 volts and then declines slightly. The pressure-time curve reaches a plateau after approximately 30% overcharge and does not rise significantly over this level at 50% or even 100% overcharge. During discharge, the gas pressure drops linearly and then levels out at about 100 psi, indicating stoichiometric consumption of hydrogen on the anode has been completed and operation of the overdischarge protection mechanism as above described. The cell voltage drops sharply when the cell begins to overdischarge and then more slowly until a sharp reversal in potential occurs. The reversal in potential is indicative of hydrogen evolution. The final potential on open circuit is close to 0.0 volts.

In practice, the cell casing is designed with a volume capacity such that sufficient negative capacity is provided for overdischarge protection and also so as to provide a sizeable differential between the gas pressure at full charge and the gas pressure at full discharge. Preferably a differential of at least a hundred and more preferably several hundred pounds per square inch is provided.

Measuring the state of charge by monitoring the pressure involves (a) providing a predetermined minimum gas pressure in the cell when it is in its fully discharged state, (b) determining the total gas pressure of the cell when it is fully charged, and (c) establishing by direct measurements the relationship between the state of charge and the gas pressure of the cell. Then with such information, it is possible to calibrate a gas pressure gauge in incremental units of state of charge and to affix such gauge to the cell so that it will respond to the cell's gas pressure. In this way the user can determine by reading the gauge the state of charge of the battery.

Figure 4:
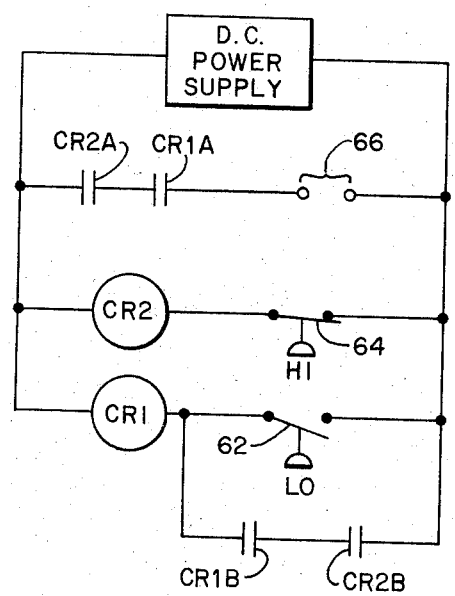
FIG. 4 illustrates a circuit for controlling recharging of a cell of the character described in accordance with the cell's gas pressure.

FIG. 4 illustrates how a cell constructed in accordance with this invention can be adapted for automatic recharging utilizing the cell's gas pressure as an indication of the state of charge.

The circuit of FIG. 4 is only exemplary and it is to be understood that other forms of charging control circuits may be used by persons skilled in the art to effect automatic recharging of batteries in accordance with this invention. The illustrated circuit comprises two relays CR1 and CR2, a d.c. power supply 60, and two pressure operated switches 62 and 64 that are connected (via tube 50 or other fitting attached to port 48 or another like situated port) to monitor the pressure in the casing. Switch 64 (identified as the "Hi" pressure switch) is normally closed and is adapted to open when the gas pressure in the cell casing reaches a predetermined level at which the cell is fully charged. Switch 62 (identified as the "Lo" pressure switch) is shown open since it is adapted to close when the cell gas pressure drops to a predetermined level at which the cell is completely discharged or almost so. The Hi pressure switch 64 is connected in series with the solenoid of relay CR2 and the power supply, while the Lo pressure switch 62 is connected in series with the solenoid of relay CR1 and the same power supply. Each relay has two sets of normally open contacts. Contacts CR1A and CR2A of relays CR1 and CR2 respectively are connected in series with the power supply via a pair of terminals 66 across which is connected a cell embodying the present invention. Contacts CR1B and CR2B of the two relays are connected in series with each other across the Lo pressure switch 62.

The circuit of FIG. 4 operates as follows: assume that the gas pressure in the cell is about 100 psi when the cell is fully discharged and about 700 psi when fully charged. Accordingly, Hi switch 64 will be set to open at about 700 psi and Lo switch 62 will be set to close when the gas pressure drops to about 110 psi. Consider now that the cell is discharging and that the gas pressure drops below 110 psi so that switch 62 closes. Relay CR1 is energized and its contacts CR1A and CR1B close. Since the other pressure switch is closed, relay CR2 is already energized and hence its contacts CR2A and CR2B are closed. As a consequence, the power supply is connected to the battery and the battery begins to recharge. This in turn causes the cell's gas pressure to rise and Lo switch 62 reopens. This has no effect on the battery charging circuit since contacts CR1B and CR2B provide a holding circuit for relay CR1 so as to keep contacts CR1A closed. The battery will continue to charge until the gas pressure in the cell is high enough to cause Hi switch 64 to open. When this occurs, relay CR2 is deenergized and its contacts CR2A and CR2B reopen. Reopening of contacts CR2A interrupts charging of the battery while reopening of contacts CR2B interrupts the holding circuit for relay CR1 and thus causes contacts CR1A and CR1B to reopen. If subsequently the cell loses some of its capacity so that the gas pressure drops below 700 psi, switch 64 will reclose and cause relay CR2 to be energized and close its contacts CR2A and CR2B. However, since relay CR1 is off, the open contacts CR1A will prevent recharging of the cell. The latter cannot occur until the gas pressure drops low enough to cause Lo switch 62 to reclose. Of course, in practice it may not be desireable to allow a cell to become fully discharged. Accordingly, the Lo switch 64 may be set to reclose before the cell is fully discharged, i.e. when the cell is discharged 50–70%.

The following example illustrates the advantages of the invention.

EXAMPLE

A $Ni/H_2$ cell having a construction as above described in connection with FIGS. 1 and 2 was fabricated. The pressure casing and end cap were made of nickel and the cell comprised a stack of 16 nickel electrodes, 17 platinum negative electrode assemblies and 32 electrolyte-porous polypropylene matrices assembled in the order shown in FIG. 2. Each anode assembly comprised a pair of screens 4, each impregnated with a platinum-Teflon coating 6 as above described, separated by a coarse nickel screen as shown at 8. Each screen 4 had a thickness of about 10 mils and had square-shaped pores measuring about 40 mils on each side. Screens 8 were about 12 mils thick and had square-shaped pores that measured about 80 mils on each side. The coatings 6 comprised about 70 wt. percent Pt. and 30 wt.% Teflon. The coatings fully filled the pores of screens 4 and extended about 1 mil beyond one side of each screen, i.e. each Pt-Teflon coating was about 11 mils thick. Each nickel electrode was about 0.076 cm (30 mils) thick and had an active area of about 9.6 $cm^2$ per side. The nickel electrodes were prepared by infiltrating the sintered nickel plaques with aqueous $Ni(NO_3)_2$ and then reacting the $Ni(NO_3)_2$ with 30% KOH to form $Ni(OH)_2$. After formation the nickel electrodes each had a capacity of 0.307 Ahr. and the stack had a capacity of about 5 Ahr. The matrices had a thickness of 7 mils and were wetted with 30% KOH. The total weight of the cell components (cell stack only including conduction tabs as shown at 26 and 30) was 103.8 grams of which 6.4 grams was electrolyte. Almost all of the electrolyte was in the cell stack, the remainder (less than about 1 gram) was left in the chamber of the nickel casing. The free space in the chamber available as gas volume was about 120 cm$^3$. The nickel positives were fully discharged prior to installation of the cell stack in the casing. The casing was initially pressurized with hydrogen to a pressure of 100 psi, at which point the hydrogen filler tube was permanently sealed off. The cell was then cycled under a variety of charge and discharge conditions. Charging was conducted at C/1, C/10 and C/15 rates while in most cases discharging was conducted at the C/1.2 rate (note the C rate was about 5 amps).

The curves of FIG. 3 exemplify the cell of this example charged at the C/1 rate and discharged at the C/1.2 rate. The cell charging efficiency was found to be decreased as the charging rate was lowered. At full charge the cell gas pressure averaged about 350 psi. At 50% overcharge the cell gas pressure averaged about 398 psi. The gas pressure at 100% overcharge was about the same as at 50% overcharge. For cell capacity measurements, the discharge cycle was cut off at 1.0 volts. The capacity of the cell was found to be approximately 5 Ahr. Discharge at the C/1.2 rate yielded 4.65-5.09 Ahr. depending on the charge cycle rate. Discharge at the C/2 rate yielded 5.20 Ahr. At the 1.0 volt cutoff, the hydrogen pressure in the cell averaged about 140 psi. This final pressure was found to be independent of the amount of time on open circuit between the charge and discharge cycles. Based upon the cell stack weight of 103.8 grams and figuring a 5 Ahr. capacity at an average cell voltage of 1.28 volts, the cell stack was found to have an energy density of 28 Whr/lb.

It is to be noted that the double electrode arrangement used for the negative is not necessary; thus each dual electrode assembly may be replaced by a single platinum electrode, e.g. the arrangement of FIG. 2 could be modified by eliminating one of the screens 4 from each anode assembly. Such a modification would increase the energy density of the cell stack to about 37 Whr/lb. It should be noted also that in the cell of this example no effort was made to optimize electrode size; however, it is recognized that optimizing electrode size will improve the energy density. A significant advantage of the dual electrode arrangement used for the negative electrode is that the coarse screen 8 facilitates diffusion of gas into the electrode stack as well as providing support for the platinum-Teflon electrodes. Accordingly, use of screens 8 or some other suitably porous member in association with the platinum-Teflon electrodes is preferred even if each anode comprises a single catalytic electrode. It also is contemplated that holes may be provided in the electrodes and electrolyte matrices to facilitate gas diffusion. Preferably but not necessarily the holes in the positive and negative electrodes are aligned with each other and also with holes in the electrolyte matrices.

Cells made in accordance with this invention offer certain specific advantages over nickel-cadmium cells. For one thing, in a Ni/Cd cell it is not possible to quantitatively determine the state of charge from the gas pressure in the cell case. Also in a Ni/Cd cell true overdischarge protection can be achieved in theory only by using a Cd precharge and an anti-polar mass. Even then it is not reliable and considerable heat evolution is to be expected. The invention also offers advantages over $Cd/O_2$ and $H_2/O_2$ cells. With the latter cells overcharge protection is difficult because the positive and negative electrodes have to be separated by a gas impermeable separator. The latter also is required in a $Cd/O_2$ cell to avoid self discharge. In the case of the $H_2/O_2$ cells, overdischarge protection requires a large water storage capacity to prevent drying of the electrolyte matrix and even under these conditions catastrophic pressure differentials can appear in an integral $H_2/O_2$ cell on overdischarge.

As noted above, the negative or hydrogen electrode essentially comprises an electrocatalyst. The latter may be platinum or palladium, as previously noted, or one of the following: Raney nickel, rhodium, columbium, silver, gold, ruthenium, osmium, or iridium, or alloys or oxides thereof. However, certain of these may be less preferable than others with respect to electrochemical activity and resistance to corrosion in the cell environment. The metal blacks of Group VIII of Mendelyeev's Periodic Table are most suitable in a fuel cell electrode since they are available in a finely divided state as required to maximize the reactive electrode surface area. Platinum is the preferred catalyst.

The negative electrode may be constructed in accordance with known fuel cell electrode technology. However, regardless of its exact structure and configuration, the negative electrode must permit gas diffusion to the reactive catalyst and must be resistant to electrolyte flooding. For this reason, it is preferred to disperse the catalyst particles in a gas permeable matrix material that is hydrophobic. The matrix material also should be resistant to corrosion and provide sufficient binding action to hold the catalyst particles in place. By way of example but not limitation, the hydrophobic binder is a polymer material. Exemplary suitable materials are polytetrafluoroethylene, polytrifluorochloroethylene, polyvinyl fluoride, polyvinylidenefluoride, polytrifluoroethylene, polystyrene, polymethylmethacrylate, polymethacrylate, polyacrylonitrile, polyvinyl chloride, polyethylene, and copolymers thereof. Teflon is the preferred polymer. The ratio of polymer to catalytic metal is not critical. Preferably, however, the catalyst-polymer mixture comprises about 50-80% metal and 50-20% polymer on a weight basis. It is preferred that the thickness of the catalyst-polymer layer be in the order of 10 mils and that such layer have a pore size distribution in the range from about 0.01 to 100 microns. Although it is possible to fabricate electrodes consisting only of a continuous film of catalyst particles in a hydrophobic polymer matrix, it is preferred to utilize a porous conductive element such as screen 4 in the electrode structure to permit more effective current takeoff, improve the mechanical integrity of the electrode and facilitate gas diffusion to the catalyst surface. Of course, screen 6 could be replaced by a sintered placque or a metal felt or mesh or wool, e.g. nickel wool. Other possible variations in the structure and method of fabricating the anodes are obvious from the teachings presented in U.S. Pat. Nos. 3,444,004, 3,533,851, and 3,553,022, and the references cited in said patents. Another possibility is use of a dual porosity electrode such as a porous nickel sinter without a hydrophobic component. In this case the small pores are filled with electrolyte by capillarity and the large pores are empty (gas filled) if the electrolyte fill level has been carefully adjusted. The catalyst is placed preferentially in the small pores.

Of course, the electrodes and electrolyte matrices also may be constructed and arranged as concentric members or bent in a spiral fashion to provide a so-called "jelly roll" structure. These alternative arrangements are well known in the battery art.

One can also incorporate cobalt hydroxide in the active nickel oxide mass of the positive electrode to improve charge cycle life. Typically about 8% of the active mass will consist of cobalt hydroxide.

Although aqueous KOH is the preferred electrolyte, the KOH may be replaced by or mixed with other alkaline salts, e.g. sodium or lithium hydroxides or mixtures thereof.

What is claimed is:

1. A rechargeable $Ni/H_2$ power cell essentially including a case, a plurality of positive electrodes in said case each positive electrode comprising $Ni(OH)_2$ in the discharged state, at least one dual porosity negative electrode in said case comprising two conductive supports having a catalyst disposed in a hydrophobic non-conducting matrix mounted on each of said supports and means between said supports for providing passages for diffusion of gas to said catalyst, said catalyst being a material capable of dissociating molecular hydrogen to monatomic hydrogen, a plurality of porus matrices in said case, each porus matrix separating one of said positive electrodes and one of said conductive supports of said dual porosity negative electrode, an alkaline electrolyte in the pores of said matrix, a supply of hydrogen in said case surrounding said electrodes and matrix, said case being hermetically sealed to prevent inflow and outflow of gas during charging and discharging of said cell.

2. A cell according to claim 1 comprising a plurality of said positive and negative electrodes and matrices disposed in stacked relation to each other, means electrically connecting said positive electrodes in parallel with each other, and means electrically connecting said negative electrodes in parallel with each other, said supply of hydrogen surrounding all of said electrodes and matrices.

3. A cell according to claim 1 wherein said nickel oxide is NiOOH and the supply of hydrogen in said case is more than sufficient to fully discharge said nickel oxide.

4. A cell according to claim 1 wherein said catalyst is disposed in a plastic hydrophobic matrix.

5. A cell according to claim 1 wherein said electrolyte fills less than all of the pores of said porous matrix so that oxygen generated at the positive electrode during charging can diffuse to and combine with hydrogen at the negative electrode.

6. A cell according to claim 1 wherein the quantity of electrolyte in said cell is insufficient to envelope said positive and negative electrodes.

7. A cell according to claim 1 wherein said matrix is made of a material that is electrically non-conductive but is permeable to hydroxyl ions, oxygen and hydrogen.

8. A cell according to claim 1 that is pressurized with hydrogen gas while said positive electrode is in a fully discharged state thereby preventing hydrogen depletion damage to the negative electrode on complete discharge of the cell.

9. A cell according to claim 1 wherein said electrodes have holes to facilitate gas diffusion.

10. A cell according to claim 1 wherein said catalyst is platinum, palladium or Raney nickel.

11. A cell according to claim 1 wherein said gas diffusion means comprises a porous conductive screen.

12. A cell according to claim 1 further including pressure transducer means in communication with the inside of said case for determining the state of charge of said cell.

* * * * *